United States Patent [19]

Jones

[11] Patent Number: 4,751,540
[45] Date of Patent: Jun. 14, 1988

[54] CAMERA TRIPOD

[76] Inventor: Mark D. Jones, 156 NE. Olvera Ct., Gresham, Oreg. 97030

[21] Appl. No.: 82,843

[22] Filed: Aug. 7, 1987

[51] Int. Cl.⁴ .................... G03B 17/00; F16M 11/38
[52] U.S. Cl. .................................. 354/293; 248/168
[58] Field of Search ................. 354/81, 293; 352/243; 248/166, 168, 169

[56] References Cited

U.S. PATENT DOCUMENTS

| | | | |
|---|---|---|---|
| 3,537,785 | 11/1970 | Jablonski | 352/243 |
| 4,545,660 | 10/1985 | Rudolf | 354/293 |
| 4,582,410 | 4/1986 | Niwaya | 354/293 |
| 4,648,698 | 3/1987 | Iwasaki | 354/293 |

FOREIGN PATENT DOCUMENTS 2804655  8/1979  Fed. Rep. of Germany .

*Primary Examiner*—A. A. Mathews
*Attorney, Agent, or Firm*—Lee R. Schermerhorn

[57] ABSTRACT

This tripod is mounted on a camera by a flat mounting plate having a slot in one end thereof forming a pair of projecting end portions having beveled ends, a pair of legs having beveled upper ends connected to the beveled ends on the projecting end portions of the mounting plate by a pair of pivot pins, a third leg between said projecting end portions of the mounting plate and connected therewith by a third pivot pin, the three legs folding together side by side in the plane of said mounting plate.

6 Claims, 1 Drawing Sheet

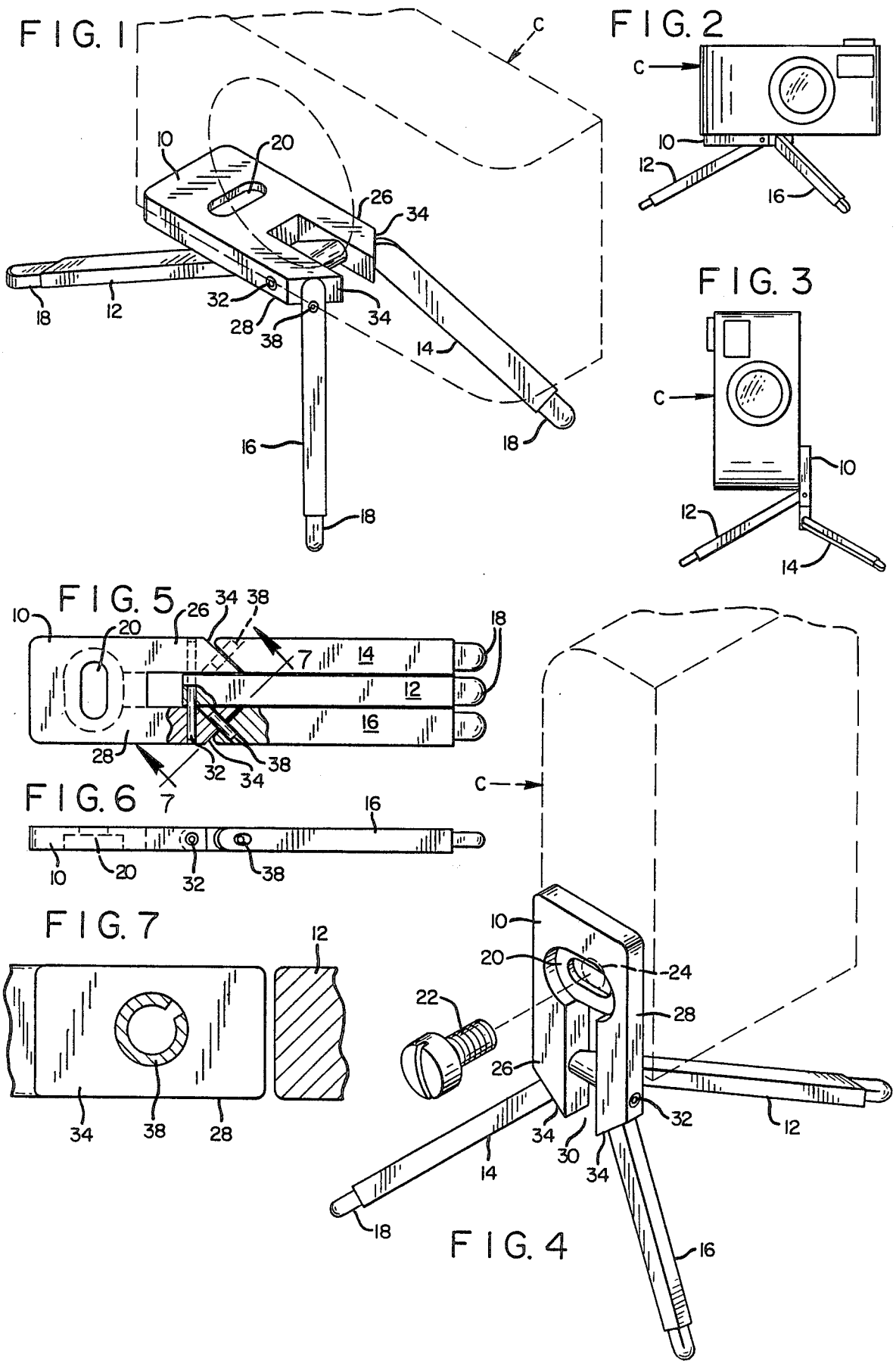

CAMERA TRIPOD

BACKGROUND OF THE INVENTION

This invention relates to a tripod for supporting an instrument such as a camera.

Most camera tripods are so cumbersome that they are often not carried with the camera and as a result the tripod is frequently not available when needed. It is desirable to have a tripod that will fold so compactly that it needs to be seldom, if ever, removed from the camera.

Attainment of this desirable objective has been attempted previously but the resulting have been excessively complicated and expensive to manufacture making them unavailable at a reasonable cost. There is a need for a compactly folding tripod of simple and inexpensive construction containing few parts.

The greatest need for a camera tripod is merely to support the camera in stable position on a sloping or uneven surface, rather than to elevate the camera high above the supporting surface. Thus, long legs are usually not necessary on the tripod.

SUMMARY OF THE INVENTION

The present tripod is of very simple construction having only a few parts and therefore economical to manufacture. The tripod is adjustable on the camera for taking either vertical or horizontal pictures. The tripod folds so compactly against one side of the camera that the combined camera and tripod will fit into a conventional camera case, making the tripod always available with the camera.

In the present form of construction, the tripod is mounted on the camera by a flat mounting plate having a slot in one end thereof forming a pair of projecting end portions having beveled ends. A pair of tripod legs having beveled upper ends is connected to the beveled ends on the end portions of the mounting plate by a pair of pivot pins. A third leg is connected by a pivot pin between said projecting end portions of the mounting plate whereby the three legs fold together side-by-side in the plane of the mounting plate.

The invention will be better understood and additional features and advantages will be apparent from the following description of the preferred embodiment illustrated in the accompanying drawings. Various changes may be made however in the details of construction and arrangement of parts and certain features may be used without others. All such modifications within the scope of the appended claims are included in the invention. The present tripod construction is not limited to use with a camera.

BRIEF DESCRIPTION OF THE DRAWINGS

FIG. 1 is a front perspective view showing the tripod mounted on a conventional camera with the camera outlined in broken lines.

FIG. 2 is a front elevation view of the combination in FIG. 1 with the tripod holding the camera in position for a horizontal picture.

FIG. 3 is a similar view with the tripod holding the camera in position for a vertical picture.

FIG. 4 is a rear perspective view showing the details of the adjustable mounting plate.

FIG. 5 is a plan view with parts broken away showing the tripod legs in folded positions.

FIG. 6 is a side elevation view of the assembly in FIG. 5.

FIG. 7 is an enlarged sectional view on the line 7—7 in FIG. 5.

DESCRIPTION OF THE PREFERRED EMBODIMENTS

The camera C is supported by a tripod having four main parts comprising a flat mounting plate 10, a center leg 12 and two other legs 14 and 16. Each leg is equipped with a rubber foot 18.

One end of mounting plate 10 has a transverse slot 20 to receive a screw 22 to attach the mounting plate to one side of the camera. Most small cameras are provided with a screw hole 24 in one side to receive such a screw 22. The screw hole is in different positions in some cameras, the slot 20 allowing the mounting plate 10 to be centered between the front and back sides of the camera as shown in FIG. 4.

The opposite end of mounting plate 10 has a pair of projecting end portions 26 and 28 on opposite sides of a longitudinal slot 30. The upper end of leg 12 is pivotally mounted in slot 30 on a transverse roll pin 32 in the end portions 26 and 28 of the mounting plate.

Each projecting end portion 26 and 28 has an outwardly facing flat beveled end face 34 disposed at an angle of 40 degrees from the direction of slot 30. The upper ends of legs 14 and 16 have correspondingly beveled end faces adapted to rotate on the beveled faces 34.

A pair of roll pins 38 form pivot pins for the legs 14 and 16 to provide for such rotation whereby these legs in folded position are aligned with the projections 26 and 28 as shown in FIG. 5. In this folded position the center leg 12 lies between the legs 14 and 16 with all three legs in the plane of mounting plate 10 as seen in FIG. 8.

When mounting plate 10 is turned to its FIG. 1 position the feet 18 do not extend beyond the edge of the camera whereby the mounting plate and three folded legs only slightly increase the overall dimensions of the combination of tripod and camera allowing the combination to be contained within a conventional type of camera carrying case.

In FIGS. 1 and 2 the mounting plate 10 is turned on screw 22 to position the legs as above described. This position of the mounting plate is used for taking horizontal pictures. For taking vertical pictures the mounting plate is turned 180 degrees on screw 22 as shown in FIGS. 3 and 4.

Roll pins 32 and 38 are resilient and are compressed for insertion into the receiving bores in the legs and projections 26 and 28. When the compression is released, the pins expand to frictionally grip the receiving bores in the legs and projections to hold all the parts in assembled relationship without any additional retaining parts. This results in a tripod of extreme simplicity.

The gripping of the roll pins with both the tripod legs and mounting plate projections 26 and 28 as seen in FIG. 7 also exerts the necessary pivotal friction to provide a stable camera support.

Mounting plate 10 may be incorporated into the camera as a permanent part thereof instead of being removable as described above.

What is claimed is:

1. A camera tripod comprising a flat mounting plate having a slot in one end thereof forming a pair of projecting end portions, beveled ends on said end portions, a pair of legs having beveled upper ends, a pair of pivot pins connecting the beveled ends of said legs to said beveled end portions of said mounting plate, and a third leg having a pivot pin connecting said third leg between said projecting end portions of said mounting plate, said three legs folding together side by side in the plane of said mounting plate.

2. A tripod as defined in claim 1, said pivot pins being roll pins.

3. A tripod as defined in claim 1 including a transverse slot in said mounting plate to receive a screw for mounting on a camera.

4. A tripod as defined in claim 1, the angle of bevel on said pair of legs and the projecting end portions of said mounting plate being approximately 40°.

5. A tripod as defined in claim 1, the surfaces on the beveled ends of said projecting end portions of the mounting plate facing outwardly away from each other.

6. A tripod as defined in claim 1, said pivot pins being roll pins, a transverse slot in said mounting plate to receive a screw for mounting on a camera, the angle of bevel on said pair of legs and the projecting end portions of said mounting plate being approximately 40° and the surfaces of said beveled ends of the projections on said mounting plate facing outwardly away from each other.

* * * * *

UNITED STATES PATENT AND TRADEMARK OFFICE
CERTIFICATE OF CORRECTION

PATENT NO. : 4,751,540
DATED : June 14, 1988
INVENTOR(S) : MARK D. JONES

It is certified that error appears in the above-identified patent and that said Letters Patent are hereby corrected as shown below:

Column 1, line 14, after "resulting" insert: --tripods--.

Signed and Sealed this

Eighteenth Day of October, 1988

*Attest:*

DONALD J. QUIGG

*Attesting Officer*   *Commissioner of Patents and Trademarks*